US009131499B2

(12) United States Patent
Seo et al.

(10) Patent No.: US 9,131,499 B2
(45) Date of Patent: Sep. 8, 2015

(54) METHOD FOR SIGNALING A SUBFRAME PATTERN FOR PREVENTING INTER-CELL INTERFERENCE FROM OCCURRING IN HETEROGENEOUS NETWORK SYSTEM AND APPARATUS FOR THE SAME

(75) Inventors: Hanbyul Seo, Anyang-si (KR); Seungmin Lee, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 155 days.

(21) Appl. No.: 13/978,853

(22) PCT Filed: Feb. 2, 2012

(86) PCT No.: PCT/KR2012/000805
§ 371 (c)(1),
(2), (4) Date: Jul. 9, 2013

(87) PCT Pub. No.: WO2012/108640
PCT Pub. Date: Aug. 16, 2012

(65) Prior Publication Data
US 2013/0286906 A1   Oct. 31, 2013

Related U.S. Application Data

(60) Provisional application No. 61/441,257, filed on Feb. 9, 2011, provisional application No. 61/441,280, filed on Feb. 10, 2011.

(51) Int. Cl.
*H04J 3/00* (2006.01)
*H04W 72/04* (2009.01)
*H04W 72/08* (2009.01)

(52) U.S. Cl.
CPC ...... *H04W 72/0446* (2013.01); *H04W 72/0426* (2013.01); *H04W 72/082* (2013.01)

(58) Field of Classification Search
USPC ......... 370/281, 295, 329, 312, 315, 496, 330, 370/338, 491, 503, 500, 280; 455/422.1, 455/458
See application file for complete search history.

(56) References Cited

U.S. PATENT DOCUMENTS

2011/0038285 A1*   2/2011   Kwon et al. .................. 370/281

OTHER PUBLICATIONS

CMCC, "Discussion on 1st ABS pattern bitmap for TDD", 3GPP TSG-RAN WG1 Meeting #63, R1-106315, Nov. 15-19, 2010.
New Postcom, "ABS signaling considerations for LTE-A TDD", 3GPP TSG-RAN WG1 Meeting #63, R1-105940, Nov. 15-19, 2010.
(Continued)

*Primary Examiner* — Chi H Pham
*Assistant Examiner* — Alexander O Boakye
(74) *Attorney, Agent, or Firm* — Dentons US LLP

(57) ABSTRACT

A method for setting an almost blank subframe (ABS) pattern in a base station of a wireless communication system is disclosed. The method comprises receiving an ABS bitmap pattern from a neighboring base station; setting the ABS pattern of the base station by repeating the ABS bitmap pattern within a previously set number of radio frames; receiving an offset value indicating an application start point of an updated ABS bitmap pattern and an application start of the updated ABS bitmap pattern from the neighboring base station; and setting the ABS pattern of the base station by repeating the updated ABS bitmap pattern from a start subframe of a specific radio frame indicated by the offset value.

6 Claims, 10 Drawing Sheets

(56) References Cited

OTHER PUBLICATIONS

LG Electronics, "Details of eICIC in Macro-Pico case", 3GPP TSG-RAN WG1 Meeting #63, R1-106143, Nov. 15-19, 2010.

InterDigital Communications, et al., "eICIC Macro-Femto: Time-domain muting and ABS", 3GPP TSG-RAN WG1 Meeting #63, R1-105951, Nov. 15-19, 2010.

* cited by examiner (a) control-plane protocol stack (b) user-plane protocol stack

METHOD FOR SIGNALING A SUBFRAME PATTERN FOR PREVENTING INTER-CELL INTERFERENCE FROM OCCURRING IN HETEROGENEOUS NETWORK SYSTEM AND APPARATUS FOR THE SAME

This Application is a 35 U.S.C. §371 National Stage Entry of International Application No. PCT/KR2012/000805, filed Feb. 2, 2012 and claims the benefit of U.S. Provisional Application Nos. 61/441,257, filed Feb. 9, 2011, and 61/441,280, filed Feb. 10, 2011, all of which are incorporated by reference in their entirety herein.

TECHNICAL FIELD

The present invention relates to a wireless communication system, and more particularly, to a method for signaling a subframe pattern for preventing inter-cell interference from occurring in a heterogeneous network system and an apparatus for the same.

BACKGROUND ART

A 3rd generation partnership project long term evolution (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (eNode B and eNB), and an Access Gateway (AG) which is located at an end of a network (E-UTRAN) and connected to an external network. The base stations may simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to indicate time and frequency domains to which data will be transmitted and information related to encoding, data size, hybrid automatic repeat and request (HARQ). Also, the base station transmits uplink (UL) scheduling information of uplink data to the corresponding user equipment to indicate time and frequency domains that can be used by the corresponding user equipment, and information related to encoding, data size, HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

DISCLOSURE OF INVENTION

Technical Problem

Accordingly, based on the aforementioned discussion, an object of the present invention is to provide a method for signaling a subframe pattern for preventing inter-cell interference from occurring in a heterogeneous network system and an apparatus for the same, which substantially obviate one or more problems due to limitations and disadvantages of the related art.

Solution to Problem

To achieve these objects and other advantages and in accordance with the purpose of the invention, as embodied and broadly described herein, in one aspect of the present invention, a method for setting an almost blank subframe (ABS) pattern in a base station of a wireless communication system comprises receiving an ABS bitmap pattern from a neighboring base station; setting the ABS pattern of the base station by repeating the ABS bitmap pattern within a previously set number of radio frames; receiving an offset value indicating an application start point of an updated ABS bitmap pattern and an application start of the updated ABS bitmap pattern from the neighboring base station; and setting the ABS pattern of the base station by repeating the updated ABS bitmap pattern from a start subframe of a specific radio frame indicated by the offset value.

In another aspect of the present invention, a base station in a wireless communication system comprises a receiving module receiving an almost blank subframe (ABS) bitmap pattern from a neighboring base station; and a processor setting the ABS pattern of the base station by repeating the ABS bitmap pattern within a previously set number of radio frames, wherein the processor receives an offset value indicating an application start point of an updated ABS bitmap pattern and an application start of the updated ABS bitmap pattern from the neighboring base station, and, in this case, sets the ABS pattern of the base station by repeating the updated ABS bitmap pattern from a start subframe of a specific radio frame indicated by the offset value.

Preferably, the offset value indicates a system frame number (SFN), and has a 10 bit size. In this case, the offset value is a multiple of a quotient obtained by dividing a period of the ABS bitmap pattern by 10.

Alternatively, the offset value may have a 3 bit size. In this case, the specific radio frame indicated by the offset value is a radio frame after the offset value from a radio frame of the closest system frame number (SFN) that satisfies "(SFN) modulo (quotient obtained by dividing period of ABS bitmap pattern by 10)=0" at the time when or after the updated ABS bitmap pattern and the offset value are received.

Moreover, the wireless communication system is a time division duplex (TDD) system, and the period of the ABS pattern is 60 ms or 70 ms.

Advantageous Effects of Invention

According to the embodiments of the present invention, the subframe pattern for preventing inter-cell interference from occurring in a heterogeneous network system can effectively be signaled and updated.

It is to be understood that the advantages that can be obtained by the present invention are not limited to the aforementioned advantages and other advantages which are not mentioned will be apparent from the following description to the person with an ordinary skill in the art to which the present invention pertains.

MODE FOR THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to a 3GPP system.

In this specification, although the embodiment of the present invention will be described based on the LTE system and the LTE-A system, the LTE system and the LTE-A system are only exemplary and the present invention may be applied to all communication systems corresponding to the aforementioned definition. Also, although the embodiment of the present invention will herein be described based on a frequency division duplex (FDD) mode, the FDD mode is only exemplary and the embodiment of the present invention may easily be applied to H-FDD mode or a time division duplex (TDD) mode.

Figure 1:
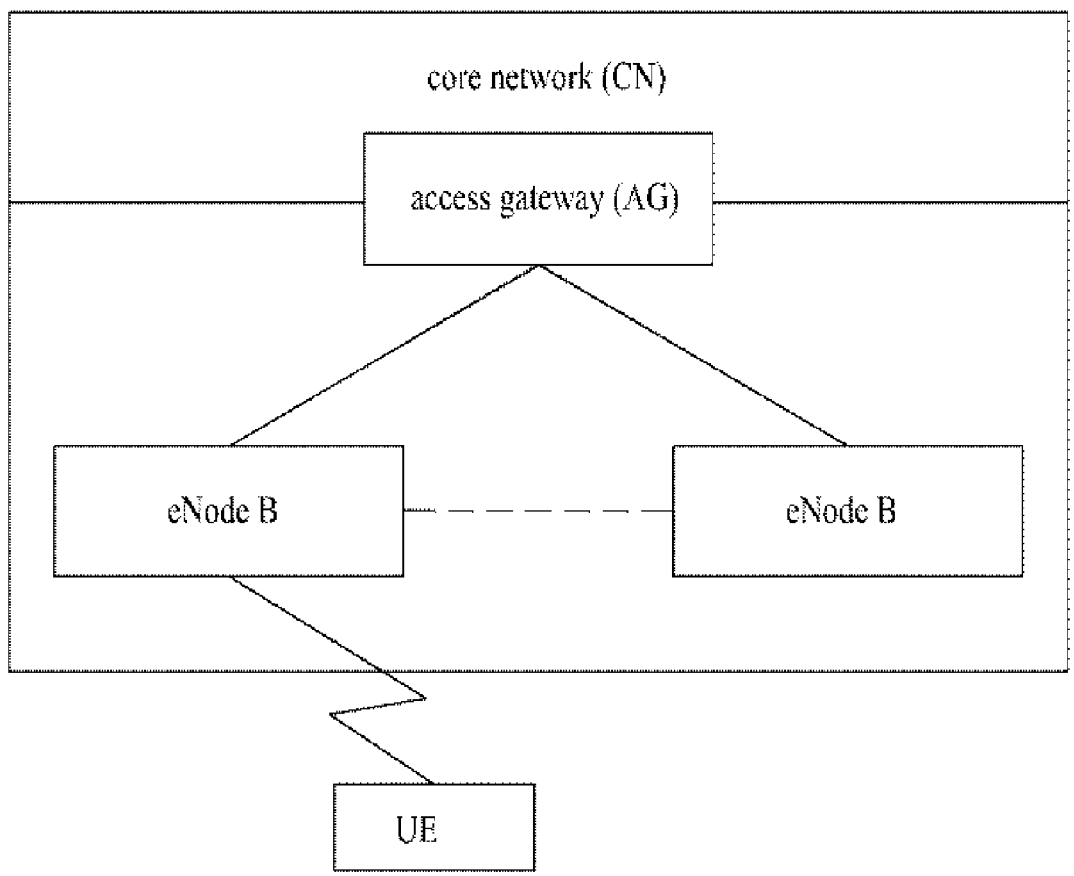
FIG. 1 is a diagram illustrating a network structure of an Evolved Universal Mobile Telecommunications System (E-UMTS) which is an example of a mobile communication system.
Figure 2:
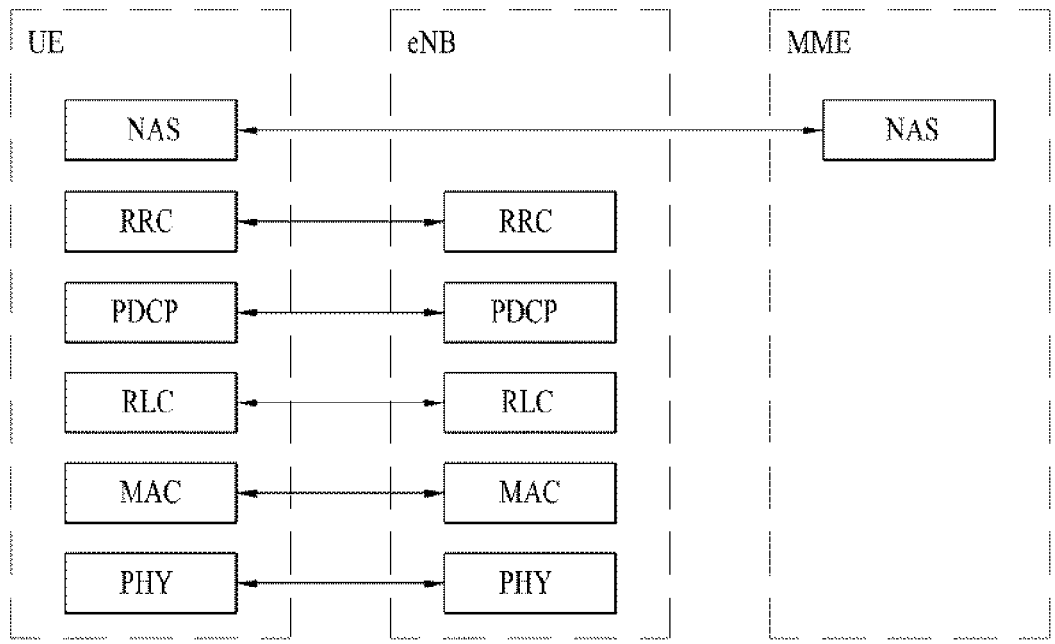
FIG. 2 is a diagram illustrating structures of a control plane and a user plane of a radio interface protocol between a user equipment and E-UTRAN based on the 3GPP radio access network standard.
Figure 2:
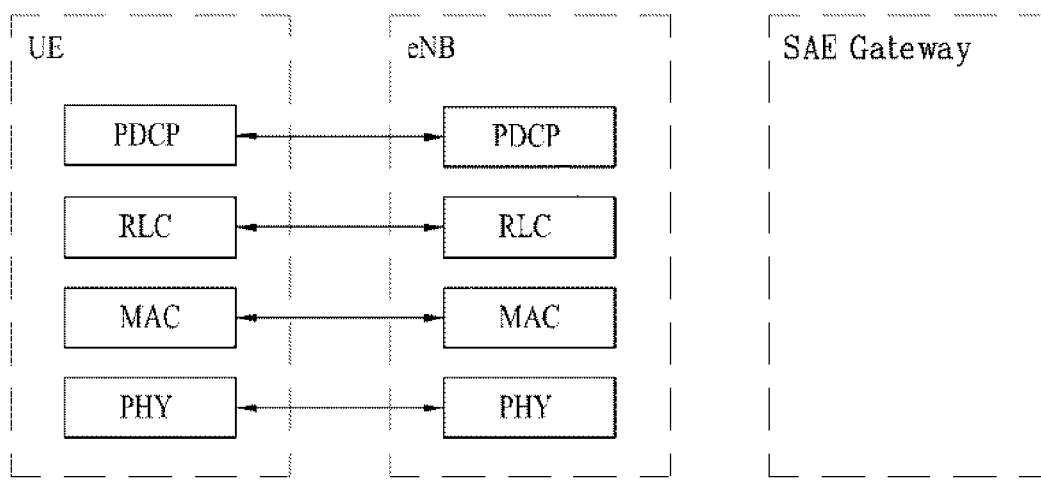

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via logical channels. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers to be in charge of controlling the logical, transport and physical channels. In this case, the radio bearer (RB) means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting a base station (eNB) is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
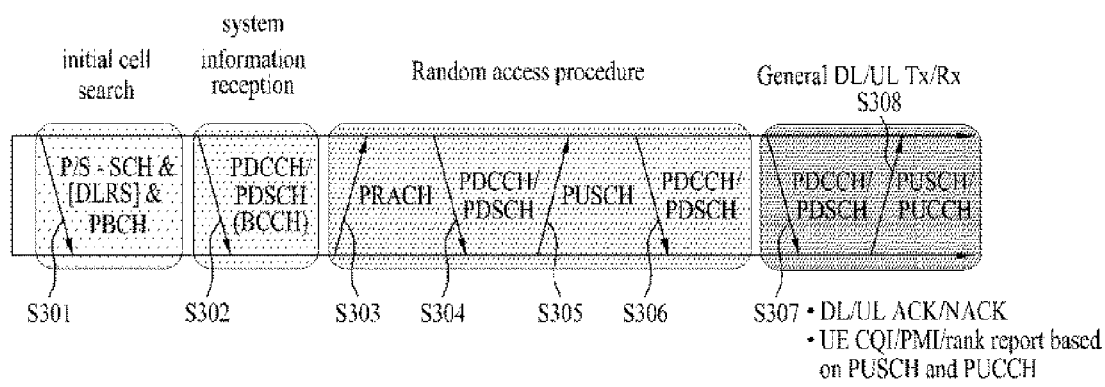
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment may acquire broadcast information within the cell by receiving a physical broadcast channel from the base station. Meanwhile, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

Meanwhile, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (S303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps receives the PDCCH/PDSCH (S307) and transmits a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information for the user equipment, and has different formats depending on its usage.

In the mean time, control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment may transmit the aforementioned control information such as CQI/PMI/RI through the PUSCH and/or the PUCCH.

Figure 4:
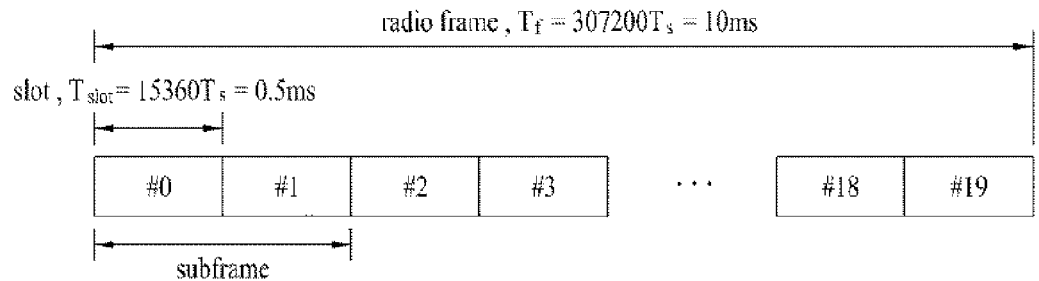
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms (327200×Ts) and includes 10 subframes of an equal size. Each sub frame has a length of 1 ms and includes two slots. Each slot has a length of 0.5 ms (15360×Ts). In this case, Ts represents a sampling time, and is expressed by Ts=1/(15 kHz×2048)=3.2552×10$^{-8}$ (about 33 ns). The slot includes a plurality of OFDM symbols in a time domain, and includes a plurality of resource blocks (RBs) in a frequency domain. In the LTE system, one resource block includes 12 subcarriers×7 (or 6) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols included in the slot.

Figure 5:
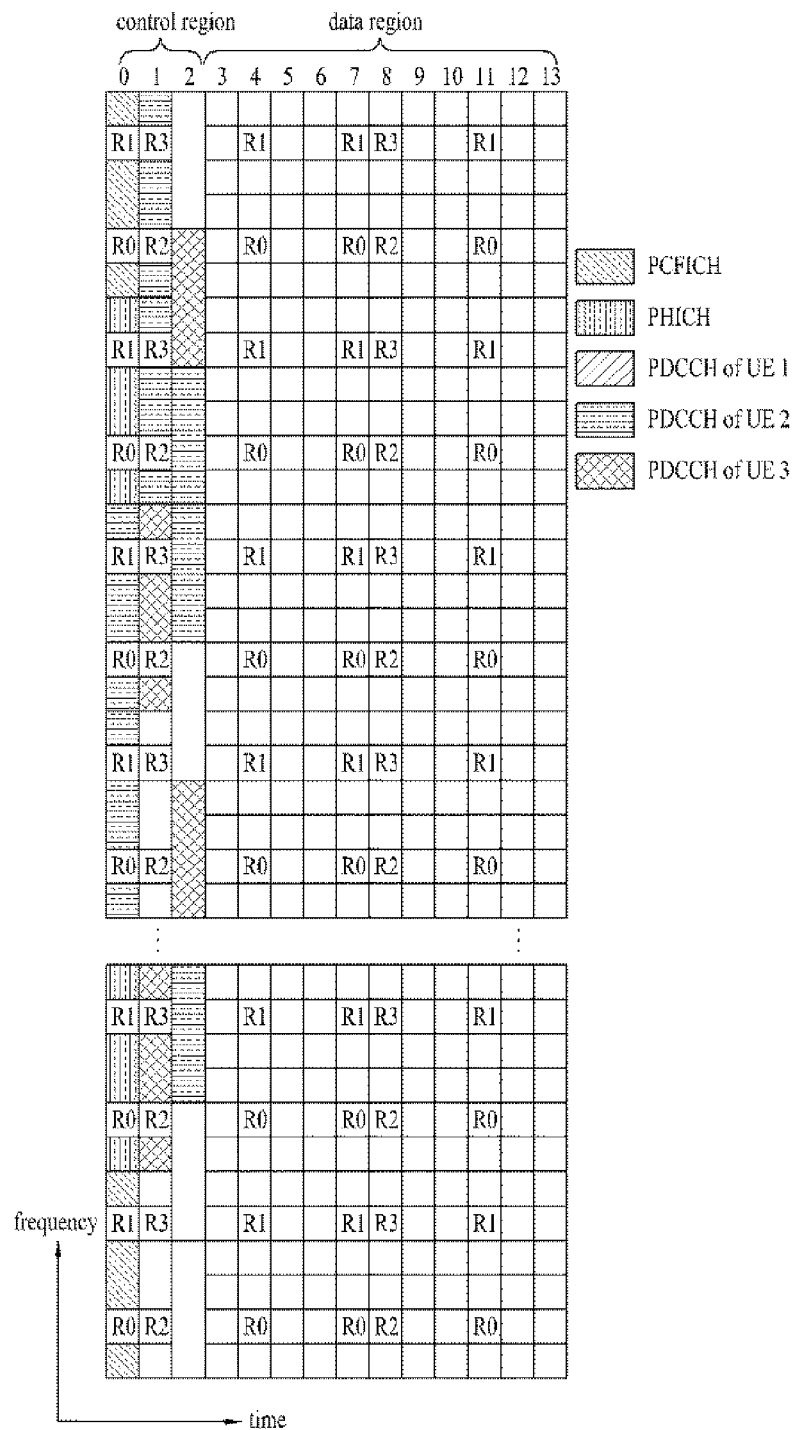
FIG. 5 is a diagram illustrating a structure of a downlink radio frame used in an LTE system.

FIG. 5 is a diagram illustrating a control channel included in a control region of one subframe in a downlink radio frame.

Referring to FIG. 5, the subframe includes fourteen (14) OFDM symbols. First one to three OFDM symbols are used as the control region in accordance with establishment of subframe, and the other thirteen to eleven OFDM symbols are used as the data region. In FIG. 5, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and established prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to transmit HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH group is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The PCH and the DL-SCH are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH using their RNTI information, and if there are one or more user equipments having RNTI called "A", the user equipments receive the PDCCH, and receive the PDSCH indicated by "B" and "C" through information of the received PDCCH.

In the LTE-A system, studies on enhanced inter cell interference coordination (eICIC) to reduce interference between a first base station eNB1 and a second base station eNB2 in a heterogeneous network (HetNet) are in progress. A representative example of the studies includes almost black subframe (ABS), and a subframe designated as the ABS is set to transmit CRS only.

Examples of a cell considered by the LTE-A system include a macro cell to femto cell and a macro cell to pico cell. In the macro cell to femto cell, it is assumed that there is no information exchange through X2 interface which is an inter-cell interface. In the macro cell to pico cell, it is assumed that there is information exchange through X2 interface. The present invention includes inter-cell subframe coordination when inter-cell information exchange is possible like the macro cell to pico cell. Although the macro cell to pico cell has been exemplarily described in the present invention, the present invention may be applied all the cases where inter-cell subframe coordination is required.

Figure 6:
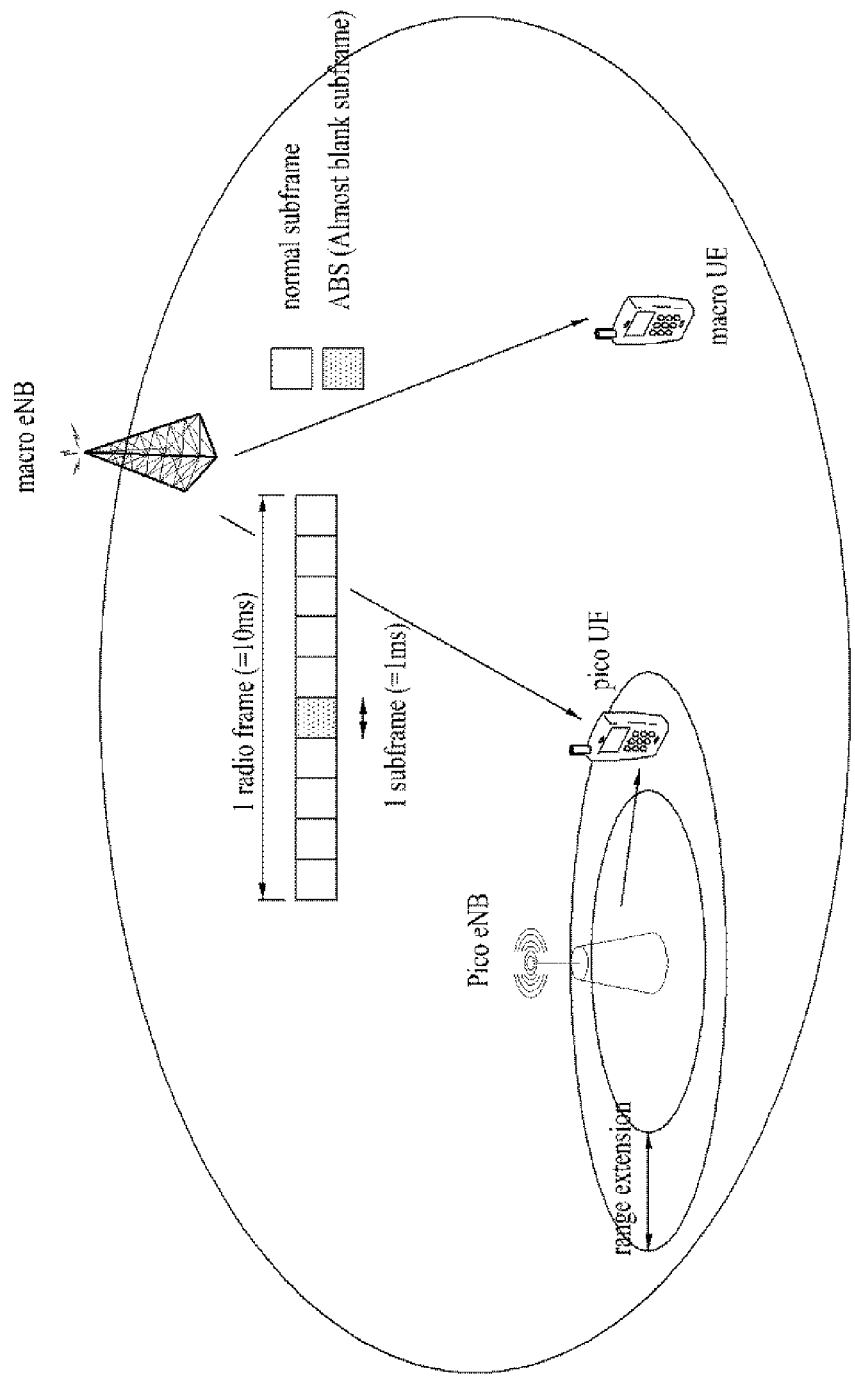
FIG. 6 is a diagram illustrating an application example of ABS in case of a macro cell to pico cell.

FIG. 6 is a diagram illustrating an application example of ABS in case of a macro cell to pico cell.

Referring to FIG. 6, range extension of the pico cell means that coverage of the pico cell is extended using receiving power offset, etc. Especially, in FIG. 6, it is assumed that a pico user equipment exists in the ranging extension region. In this case, since the pico user equipment has a signal weakened from eNB of the pico cell and interference enhanced from the macro cell, receiving performance from the pico cell is reduced due to interference from the eNB of the macro cell.

Accordingly, as illustrated in FIG. 6, one or more of subframes transmitted from the eNB of the macro cell are designed as ABS and data except for CRS are not transmitted, and the eNB of the pico cell may allocate the corresponding subframe designed as the ABS to the pico user equipment UE existing in the ranging extension region.

In the mean time, under the circumstances that the eNB of the macro cell and the eNB of the pico cell coexist, if the eNB of the macro cell signals an update ABS pattern to the eNB of the pico cell to update the ABS pattern, a problem may occur in that an application start point of the signaled update ABS pattern is ambiguous due to delay of the X2 interface. Accordingly, the present invention suggests that the eNB of the pico cell, which has received the update ABS pattern from the eNB of the macro cell through the X2 interface, defines the application start point of the update ABS pattern.

Hereinafter, for convenience of description, although the present invention is described based on the 3GPP LTE system, it will be apparent that the present invention may be applied to other wireless communication systems.

The following Table 1 illustrates an ABS bitmap pattern period in the 3GPP LTE FDD/TDD system.

TABLE 1

| | FDD | TDD |
|---|---|---|
| Pattern Period | 40 ms | 20 ms for DL/UL configuration 1~5, 70 ms for DL/UL configuration 0, 60 ms for DL/UL configuration 6 |

Generally, the application start point of the ABS pattern may be defined as subframe index #0 of a radio frame which is a "system frame number (SFN)=0". Also, the ABS pattern is continuously repeated over all the radio frames based on the ABS bitmap pattern period of Table 1 and restarts from the SFN #0.

In this case, the SFN has an integer value between 0 and 1023, and 1024 radio frames have a total length of 10240 ms. The SFN is repeated at a period of the total length of the radio frames. However, in this case, since the SFN period, that is, 10240 ms is not a multiple of the ABS bitmap pattern period defined for each of TDD UL/DL configuration #0 and #6 as illustrated in Table 1, if the ABS pattern is updated, a problem occurs in that the application start point of the updated ABS pattern is ambiguous. The problem will be described in more detail with reference to the drawing.

Figure 7:
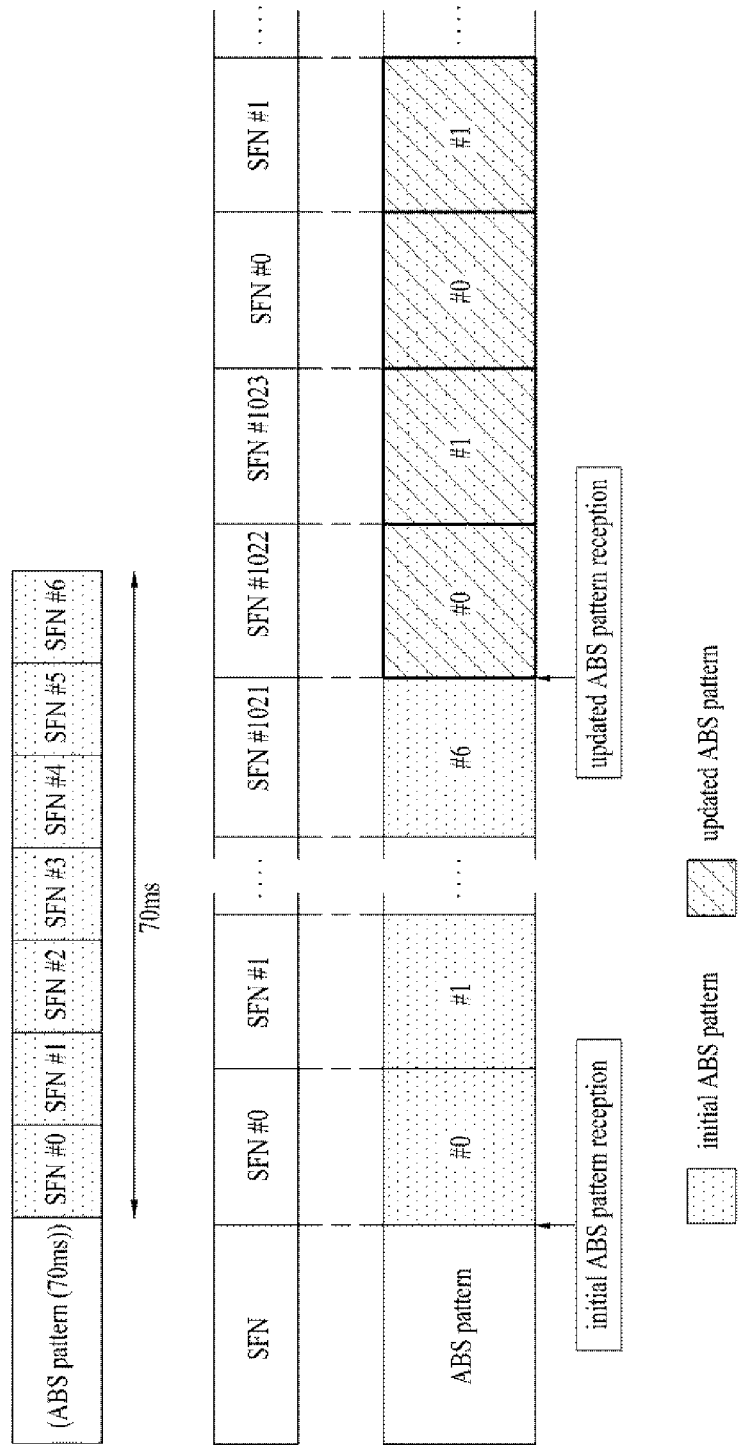
FIG. 7 is a diagram illustrating a problem that may occur when an application start point of an ABS pattern is defined in accordance with the related art.

FIG. 7 is a diagram illustrating a problem that may occur when an application start point of an ABS pattern is defined in accordance with the related art. In particular, in FIG. 7, it is assumed that the ABS bitmap pattern corresponds to TDD UL/DL configuration #0 and its period is 70 ms.

Referring to FIG. 7, the length of the ABS pattern repeated and applied for one SFN period (10240 ms) at UL/DL configuration #0 becomes "70 ms×146=10220 ms". Accordingly, according to the receiving time of the update ABS pattern illustrated in FIG. 7, ABS pattern prior to update of 70 ms may be repeated until SFN #0~#1021, a portion of 20 ms at the front end of the update ABS pattern may be applied for 20 m of SFN #1022 and #1023, and the front end of the update ABS pattern may again be repeated for next SFN #0.

Figure 8:
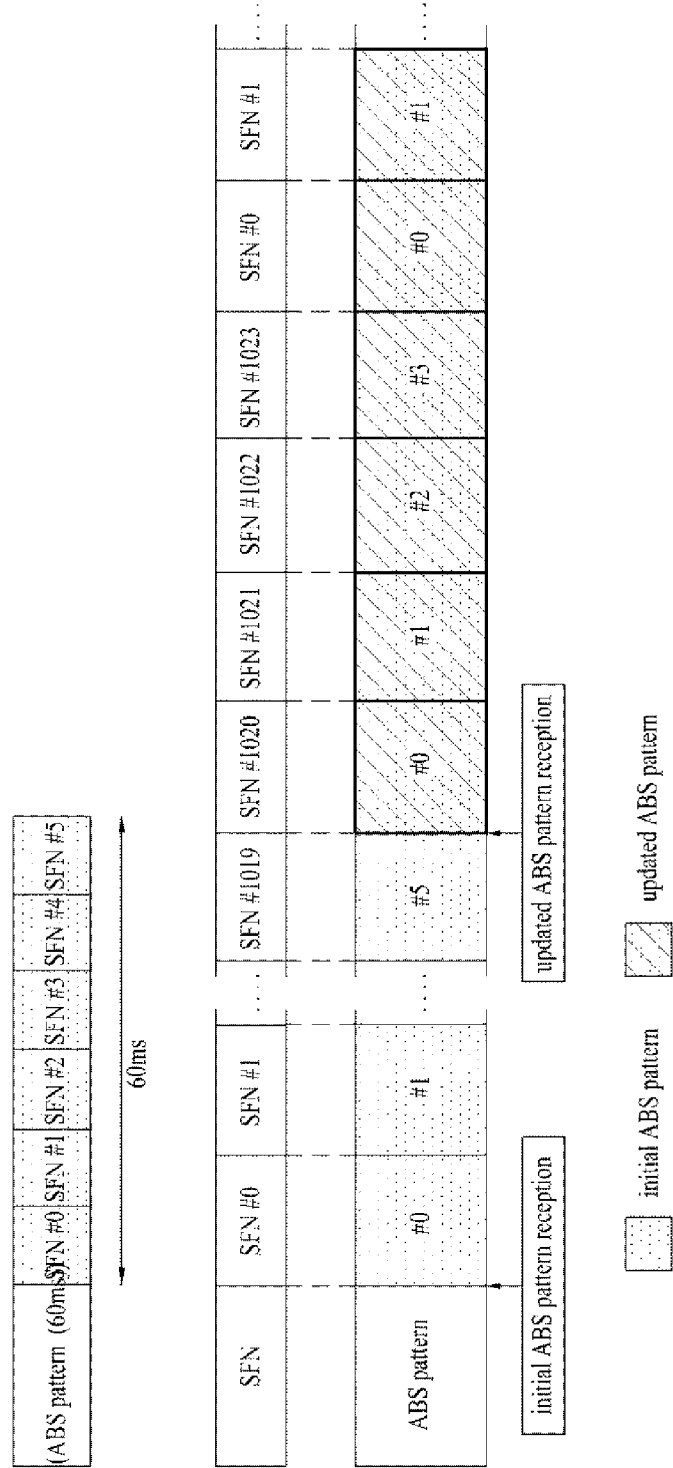
FIG. 8 is another diagram illustrating a problem that may occur when an application start point of an ABS pattern is defined in accordance with the related art.

FIG. 8 is another diagram illustrating a problem that may occur when an application start point of an ABS pattern is defined in accordance with the related art. In particular, in FIG. 8, it is assumed that the ABS bitmap pattern corresponds to TDD UL/DL configuration #6 and its period is 60 ms.

Referring to FIG. 8, the length of the ABS pattern repeated and applied for one SFN period (10240 ms) at UL/DL configuration #6 becomes "60 ms×170=10220 ms". Accordingly, according to the receiving time of the update ABS pattern illustrated in FIG. 8, ABS pattern prior to update of 60 ms may be repeated until SFN #0~#1019, a portion of 40 ms at the front end of the update ABS pattern may be applied for 40 m of SFN #1020, #1021, #1022 and #1023, and the front end of the update ABS pattern may again be repeated for next SFN #0.

Hereinafter, in order to solve the aforementioned problem and provide an ABS pattern synchronized between the eNB (MeNB) of the macro cell and the eNB (PeNB) of the pico cell, the following method is suggested.

It is suggested that the MeNB signals an offset value of the update ABS bitmap pattern application start point to the PeNB through the X2 interface together with the update ABS bitmap pattern. After receiving information on the offset value and the update ABS bitmap pattern, the PeNB may set the first subframe, to which the update ABS bitmap pattern is applied, to subframe #0 of the radio frame which is "SFN=offset value".

In this case, the offset value of the update ABS bitmap pattern application start point may be configured by 10 bit information. This is because that the SFN includes a total of 1024=210 from 0 to 1023. Also, the offset value may be limited to a multiple of the quotient obtained by dividing the ABS bitmap pattern period by 10. Actually, since the X2 interface is a wire network, 10 bit size may not be great overhead.

Alternatively, the offset value of the update ABS bitmap pattern application start point may be configured by 3 bit information. In this case, the offset value may be applied by the closest SFN that satisfies "(SFN) modulo (quotient obtained by dividing the ABS bitmap pattern period by 10)=0" at the time when or after the update ABS bitmap pattern and the offset value of 3 bit size are received.

For example, if the offset value of 3 bit size is "011" and the closest SFN that satisfies "(SFN) modulo (quotient obtained by dividing the ABS bitmap pattern period by 10)=0" is SFN #a at the time when or after "the update ABS bitmap pattern" and "the offset value of 3 bit size" are received, the update ABS bitmap pattern is applied at the subframe #0 of the radio frame which is SFN#(a+3). In this case, 30 ms at the front of the ABS bitmap pattern prior to update may be applied to SFN #a, SFN#(a+1) and SFN#(a+2), or 30 ms portion at the rear end of the update ABS pattern may be applied thereto through cyclic prefix.

Figure 9:
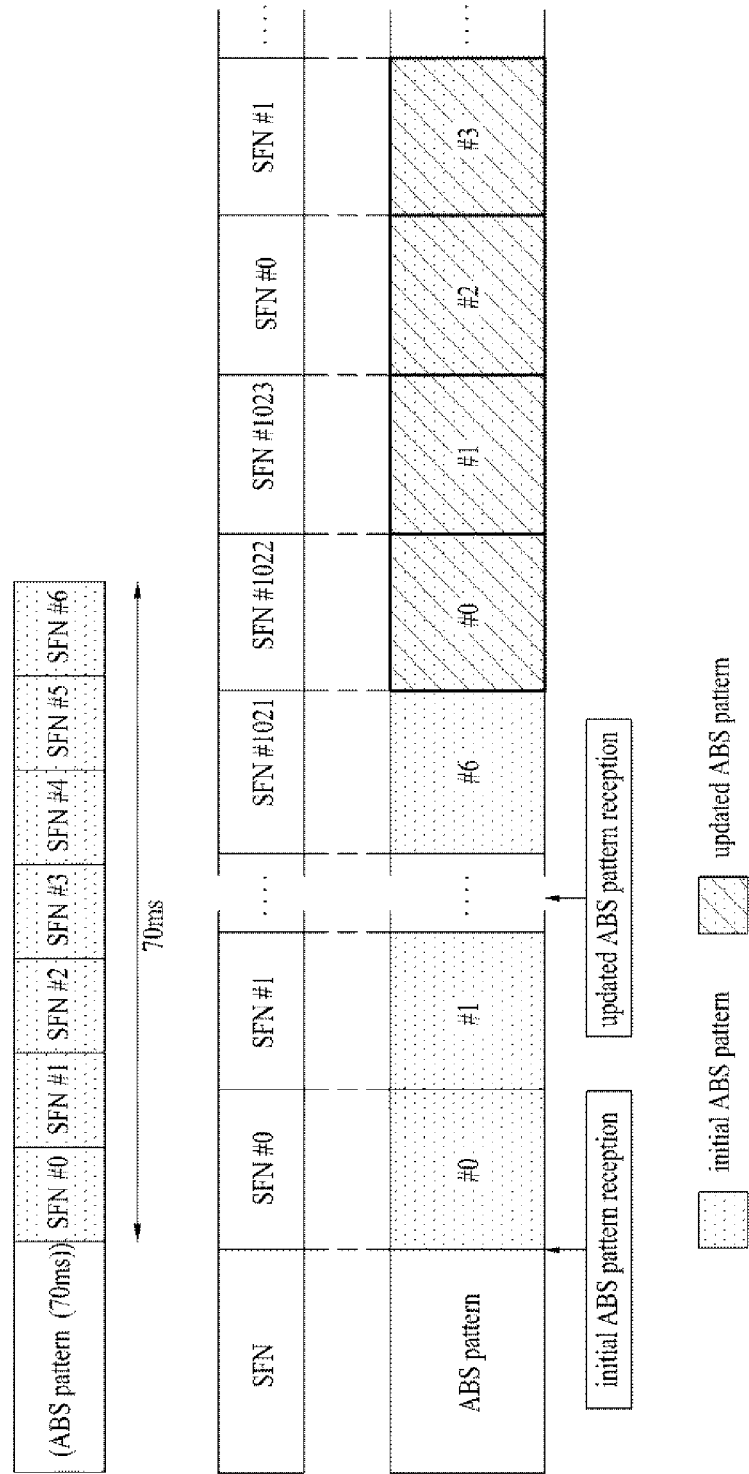
FIG. 9 is a diagram illustrating an example of an application start point of an ABS pattern in accordance with the embodiment of the present invention.

FIG. 9 is a diagram illustrating an application example of an application start point of an ABS pattern in accordance with the embodiment of the present invention. In particular, in FIG. 9, it is assumed that the ABS bitmap pattern corresponds to TDD UL/DL configuration #0 and its period is 70 ms.

Referring to FIG. 9, the update ABS bitmap pattern and the offset value are received prior to SFN #1021. In this case, it is assumed that an offset value of 10 bit size is "1 1 1 1 1 1 1 1 1 0", that is, SFN #1022 is signaled. Accordingly, the updated offset value starts from the subframe #0 of the radio frame which is SFN #1022.

Also, if the offset value of 3 bit size is applied, since the closest SFN that satisfies "(SFN) modulo (70/10)=0" is SFN #1022, it may be signaled by "000", whereby the same result as that of the offset value of 10 bit size may be obtained.

Figure 10:
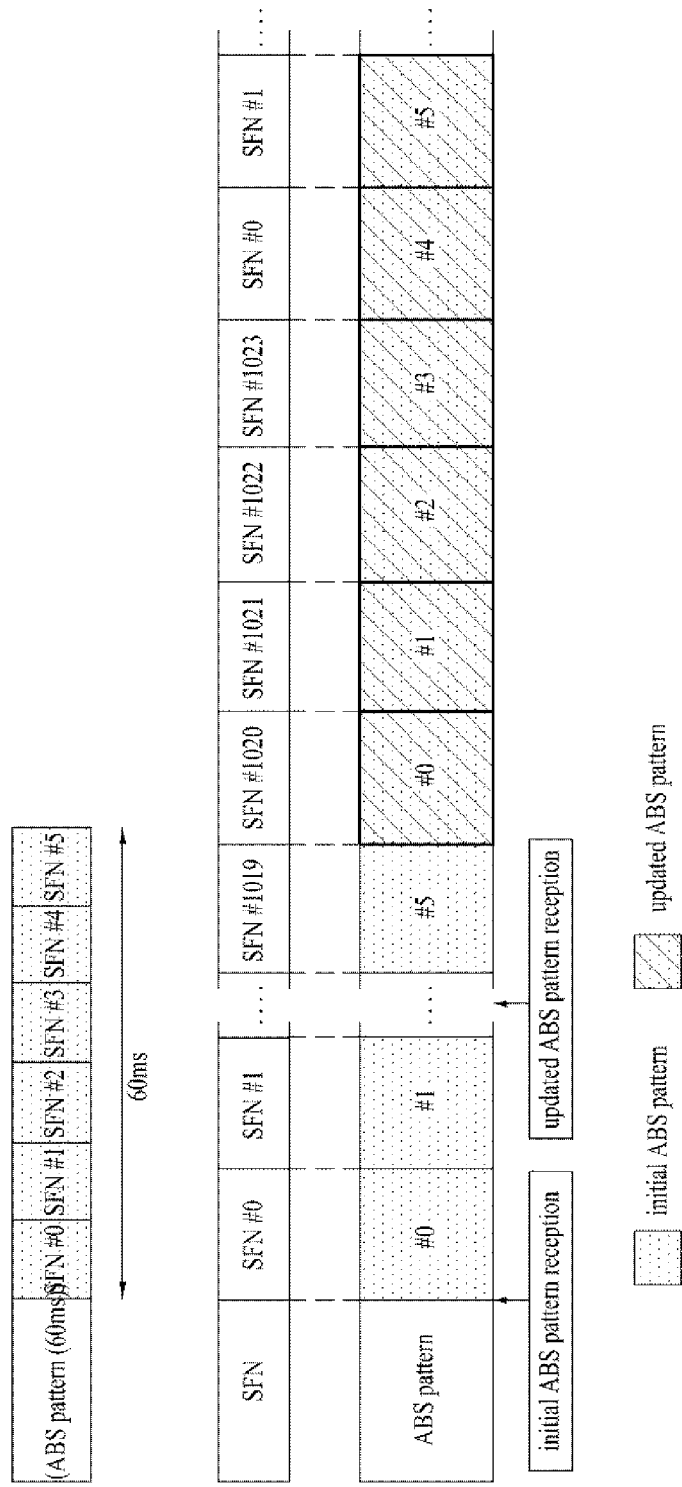
FIG. 10 is a diagram illustrating another example of an application start point of an ABS pattern in accordance with the embodiment of the present invention.

FIG. 10 is another diagram illustrating an application example of an application start point of an ABS pattern in accordance with the embodiment of the present invention. In particular, in FIG. 10, it is assumed that the ABS bitmap pattern corresponds to TDD UL/DL configuration #6 and its period is 60 ms.

Referring to FIG. 10, the update ABS bitmap pattern and the offset value are received prior to SFN #1021. In this case, it is assumed that an offset value of 10 bit size is "1 1 1 1 1 1 1 1 0 0", that is, SFN #1020 is signaled. Accordingly, the updated offset value starts from the subframe #0 of the radio frame which is SFN #1020.

Also, if the offset value of 3 bit size is applied in FIG. 10, since the closest SFN that satisfies "(SFN) modulo (60/10) =0" is SFN #1020, it may be signaled by "000", whereby the same result as the case where the offset value of 10 bit size is "1111111100" may be obtained.

Figure 11:
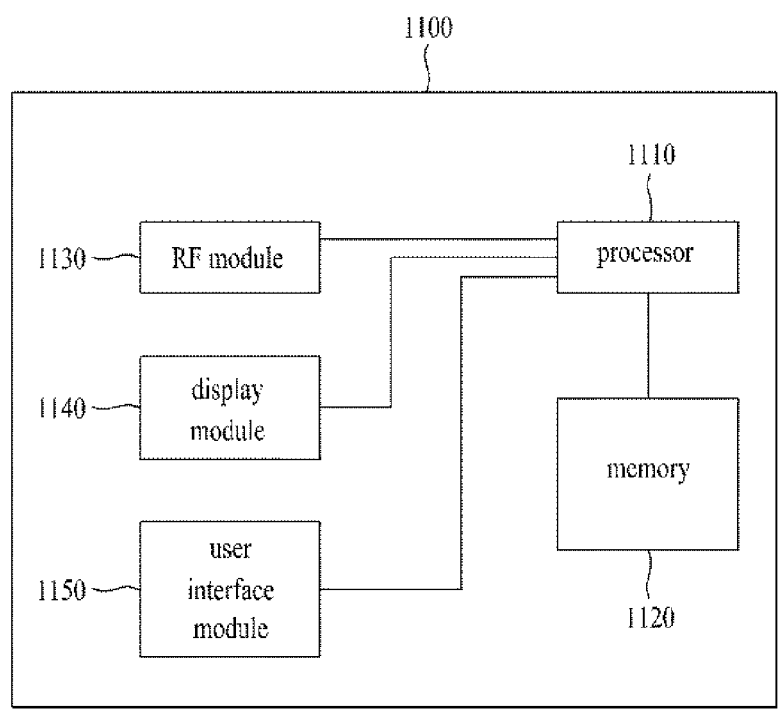
FIG. 11 is a block diagram illustrating a communication apparatus according to one embodiment of the present invention.

FIG. 11 is a block diagram illustrating a communication apparatus according to one embodiment of the present invention.

Referring to FIG. 11, the communication apparatus 1100 includes a processor 1110, a memory 1120, a radio frequency (RF) module 1130, a display module 1140, and a user interface module 1150.

The communication apparatus 1100 is illustrated for convenience of description, and some of its modules may be omitted. Also, the communication apparatus 1100 may further include necessary modules. Moreover, some modules of the communication apparatus 1100 may be divided into segmented modules. The processor 1110 is configured to perform the operation according to the embodiment of the present invention illustrated with reference to the drawings. In more detail, the detailed operation of the processor 1110 will be understood with reference to the description of FIG. 1 to FIG. 10.

The memory 1120 is connected with the processor 1110 and stores an operating system, an application, a program code, and data therein. The RF module 1130 is connected with the processor 1110 and converts a baseband signal to a radio signal or vice versa. To this end, the RF module 1130 performs analog conversion, amplification, filtering and frequency uplink conversion, or their reverse processes. The display module 1140 is connected with the processor 1110 and displays various kinds of information. Examples of the display module 1140 include, but not limited to, well-known elements such as a liquid crystal display (LCD), a light emitting diode (LED), and an organic light emitting diode (OLED). The user interface module 1150 is connected with the processor 1110, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for signaling a subframe pattern for preventing inter-cell interference from occurring in a heterogeneous network system and the apparatus for the same have been described based on the 3GPP LTE system, they may be applied to various wireless communication systems in addition to the 3GPP LTE system.

The invention claimed is:

1. A method for setting an almost blank subframe (ABS) pattern at a base station in a wireless communication system, the method comprising:
   receiving an ABS bitmap pattern from a neighboring base station;
   setting the ABS pattern of the base station by repeating the ABS bitmap pattern within a predetermined number of radio frames;
   receiving an updated ABS bitmap pattern and an offset value indicating a start point of the updated ABS bitmap pattern from the neighboring base station; and
   setting the ABS pattern of the base station by repeating the updated ABS bitmap pattern from a first subframe of a specific radio frame indicated by the offset value,
   wherein the offset value is a multiple of a quotient obtained by dividing a period of the ABS bitmap pattern by 10.

2. The method according to claim 1, wherein the offset value indicates a system frame number (SFN), and has a 10 bit size.

3. The method according to claim 1, wherein the wireless communication system is a time division duplex (TDD) system, and the period of the ABS pattern is 60 ms or 70 ms.

4. A base station in a wireless communication system, the base station comprising:
   a receiving module receiving an almost blank subframe (ABS) bitmap pattern from a neighboring base station; and
   a processor setting the ABS pattern of the base station by repeating the ABS bitmap pattern within a predetermined number of radio frames,
   wherein the receiving module receives an updated ABS bitmap pattern and an offset value indicating a start point of the updated ABS bitmap pattern from the neighboring base station,
   wherein the processor sets the ABS pattern of the base station by repeating the updated ABS bitmap pattern from a first subframe of a specific radio frame indicated by the offset value, and
   wherein the offset value is a multiple of a quotient obtained by dividing a period of the ABS bitmap pattern by 10.

5. The base station according to claim 4, wherein the offset value indicates a system frame number (SFN), and has a 10 bit size.

6. The base station according to claim 4, wherein the wireless communication system is a time division duplex (TDD) system, and the period of the ABS pattern is 60 ms or 70 ms.

* * * * *